United States Patent [19]

Panster et al.

[11] Patent Number: 5,019,637

[45] Date of Patent: May 28, 1991

[54] ORGANOPOLYSILOXANE UREA DERIVATIVES AND ORGANOPOLYSILOXANE THIOUREA DERIVATIVES, METHODS OF THEIR PREPARATION AND USE

[76] Inventors: Peter Panster, Im Lochseif 8, D-6458 Rodenbach; Ulrich Deschler, Birkenweg 1, D-6450 Hanau 9, both of Fed. Rep. of Germany

[21] Appl. No.: 431,219

[22] Filed: Nov. 3, 1989

[30] Foreign Application Priority Data

Nov. 4, 1988 [DE] Fed. Rep. of Germany ....... 3837415

[51] Int. Cl.$^5$ ............................................. C08G 77/04
[52] U.S. Cl. ........................................ 528/25; 528/10; 528/41; 556/421
[58] Field of Search ................... 556/421; 528/25, 10, 528/41

[56] References Cited

U.S. PATENT DOCUMENTS 4,851,492 7/1989 Panster et al. ...................... 556/421
4,855,470 8/1989 Panster et al. ...................... 556/421

FOREIGN PATENT DOCUMENTS 0276860 3/1988 European Pat. Off. ............ 556/421

*Primary Examiner*—Melvyn I. Marquis
*Assistant Examiner*—Karen A. Hellender

[57] ABSTRACT

The invention is relative to optionally cross-linked organopolysiloxane urea derivatives and thiourea derivatives consisting of:

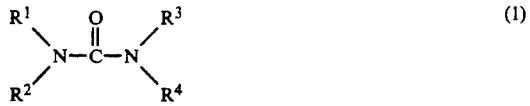

wherein
X stands for O or S and
$R^1$ is a group of the formula:

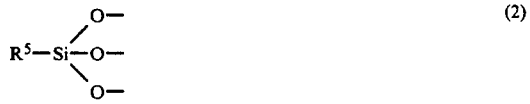

in which $R^5$ is alkylene with 1 to 10 C atoms or cycloalkylene with 5 to 8 C atoms or a group of the formula:

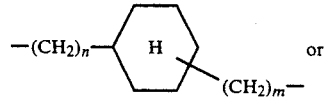

or

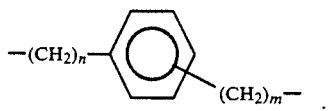

with
n=1-6 (on the nitrogen)
m=0-6 (on the silicon), wherein $R^2$ has the same meaning as $R^1$ or stands for H, $R^3$ and $R^4$ have the same meaning as $R^1$ or stands for H or alkyl with 1 to 5 C atoms. At least two but at the most three groups according to formula (2) are bound to the units according to formula (1). The free valances of the oxygen atoms bound to the silicon atom are saturated by silicon atoms of further groups of formula (2) with the optional inclusion of cross-linking agents. In addition, preparative methods for the products and a use for the removal of dissolved metals from liquid phases are indicated.

15 Claims, No Drawings

ORGANOPOLYSILOXANE UREA DERIVATIVES AND ORGANOPOLYSILOXANE THIOUREA DERIVATIVES, METHODS OF THEIR PREPARATION AND USE

INTRODUCTION AND BACKGROUND

The present invention relates to new derivatives of urea and of thiourea based on organopolysiloxanes which are insoluble in water and organic solvents The new derivatives have various applications in industry. The polymeric ureas are primarily precursors for corresponding carbodiimide derivatives which, for their part, can be used as insoluble reagents in chemical synthesis. In contrast thereto, the polymeric thioureas are used especially as metal adsorbing agents. Methods of preparing and using the new products are other aspects of the present invention.

Reagents based on organic polymers are increasingly used in chemical synthesis and applications, e.g. as ion exchangers, catalytic carriers, metal adsorbing agents, enzyme carriers or carriers of functional groups. Examples are described in Chem. Ing. Tech., Vol. 51, no. 7, p. 728 (1979), in Chem. Rev., vol. 81, p. 557 (1981) or in Annu. Rep. Prog. Chem, Sect. B 83, p. 283 (1986) publ. (1987).

When these compounds are used, the organic polymer matrix sometimes does not meet the requirements placed thereon of thermal and mechanical stability, inertness to chemical attacks, accessibility of the functional groups and solubility in the solvent used. These difficulties could be avoided if inorganic polymer systems such as e.g. silica gel, aluminum oxide or titanium dioxide were used as carriers Such systems exhibit the advantages of a fixed, rigid structure, lack of swelling capacity, high resistance to temperature and ageing, insolubility and ready accessibility of the functional groups present. It is known with respect to the foregoing that inorganic carriers have already been provided with suitable functional groups, as is described e.g., in DE-OS 24 33 409. However, a significant disadvantage of these known products is the low functionality.

According to a new concept of the hydrolysis and polycondensation of suitable organofunctional silanes, corresponding organofunctional polysiloxanes have been obtained in the meantime which exhibit a high functionality on the one hand and on the other hand good matrix properties as in the case of inorganic polymers. A survey about such polymers is presented in Angewandte Chemie, vol. 98, p. 237 (1986).

SUMMARY OF THE INVENTION

An object of the present invention is to broaden the palette of available organopolysiloxanes and of making new derivatives available which contain a urea group or thiourea group as a functional group. The ureas should represent precursors for corresponding carbodiimides whereas the thioureas can be used directly, e.g. as metal adsorbing agents.

In achieving the above and other objects, one feature of the invention resides in organopolysiloxanes which are characterized in that they are made up of units of the formula (I):

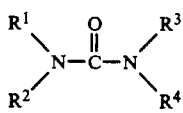
(1)

wherein
X stands for O or S and
$R^1$ is a group of the formula:

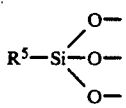
(2)

in which $R^5$ is an alkylene with 1 to 10 C atoms or cycloalkylene with 5 to 8 C atoms or a group of the formula:

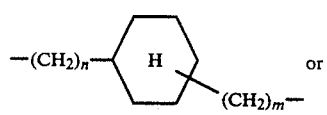 or

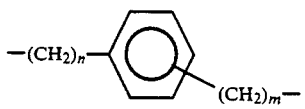

with
n=1-6 ( on the nitrogen)
m=0-6 ( on the silicon),
wherein $R^2$ has the same meaning as $R^1$ or stands for H, $R^3$ and $R^4$ likewise have the same meaning as $R^1$ or stand for H or a linear or branched alkyl group with 1 to 5 C atoms and can be identical or different
and further wherein always at least two but at the most three groups according to formula 2 are bound to the units according to formula 1 and the free valences of the oxygen atoms bound to the silicon atom are saturated as in silica skeletons by silicon atoms o further groups of formula 2 and/or via the metal atoms in one or more crosslinking bridge members:

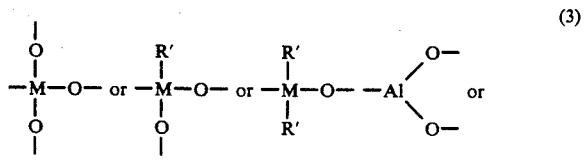
(3)

in which M is a silicon, titanium or zirconium atom and R' is a phenyl group or a linear or branched alkyl group with 1 to 5 C atoms. The ratio of the silicon atoms from the groups of the formula 2 to the metal atoms in the bridge members according to formula 3 is 1:0 to 1:10.

The monomeric precursors of the polymeric ureas and thioureas are in principle known compounds and described e.g. in DE.OS 34 24 535 and in the patent application P 38 21 465.2. Typical monomers are e.g.

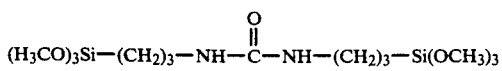

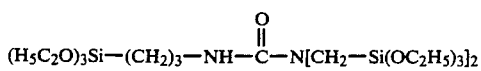

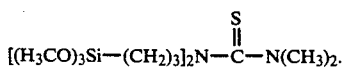

The composition of the polymer units which can be prepared therefrom can be described by the formulas:

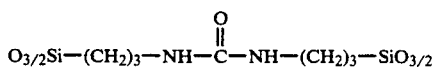

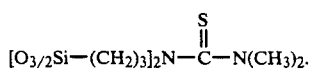

In the case of the preparation of so-called cross-linked derivatives, they can naturally be present in differing forms, even if there is no difference in the chemical composition. On the one hand, the groups according to formula 1 and formula 3 can be present adjacent to each other in a purely statistical distribution. Or, they can be present adjacent to each other in the form of blocks or also at the same time in the form of blocks and statistically distributed. Each of these possible forms is obtained according to a certain method which also constitutes subject matter of the invention and is described in more detail below.

Special advantages regarding the availability of the initial materials and regarding the material properties were achieved with polymers in which the units according to formula 2 represent a group of the formula:

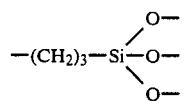

A further feature of the invention resides in methods of preparing the polymers above described. In one aspect thereof, the method provides that a monomeric urea or thiourea of the following formula is dissolved in a solvent which is miscible with water to a great extent but dissolves the urea or thiourea according to formula (4) and cross-linking agents according to formula (6):

in which $R^6$ stands for a group of the formula:

$$R^5-Si(OR^{10})_3 \quad (5)$$

and $R^5$ has the same meaning as in formula 2, $R^{10}$ stands for linear or branched alkyl with 1 to 5 C atoms, $R^7$ has the same meaning as $R^6$ or stands for H, $R^8$ and $R^9$ have the same meaning as $R^6$ or stand for H or linear or branched alkyl with 1 to 5 C atoms and can be identical or different, and wherein at least 2 but at the most 3 groups according to formula 5 are always bound to the units according to formula 4.

Optionally, one or more cross-linking agents of the following formula can be added to the urea or thiourea:

$$M(OR)_{2-4}R'_{0-2} \text{ or } M(OR)_{2-3} R'_{0-1} \quad (6)$$

whereby

M is silicon, titanium, zirconium or aluminum,

R' is a linear or branched alkyl with 1 to 5 C atoms or phenyl and

R is a linear or branched alkyl with 1 to 5 C atoms and whereby the ratio of the silicon atoms from the groups of general formula 5 to the metal atoms of formula 6 is 1:0 to 1:10.

An amount of water is added to the resulting solution under agitation which suffices at least for a complete hydrolysis and condensation. The reaction mixture is gelled under further agitation at a certain temperature in a range from room temperature to 200° C., whereby a solid product of reaction is formed. The developing solid is agitated further, optionally after the addition of more solvent or water, up to 48 hours at room temperature to 200° C. at normal pressure or at a pressure which corresponds to the sum of the partial pressures at the particular temperature. Then the resulting solid polycondensate is separated according to conventional techniques from the liquid phase, optionally washed, and is dried at room temperature to 250° C. The drying can take place under an atmosphere of protective gas or in a vacuum, if desired. The resulting product can also be tempered subsequently 1 to 100 hours at temperatures ranging from 150° to 300° C. in the air, under an atmosphere of protective gas or in a vacuum. Thereafter, if desired the product can be ground and/or classified.

Instead of the alkoxy silyl compounds, the corresponding halogenide or phenoxy compounds can also be used in principle as initial materials; however, their use offers no advantages but rather can cause problems, e.g. in the case of the chlorides, on account of the hydrochloric acid liberated during hydrolysis.

The hydrolysis of the initial materials and optional cross-linking agents must be carried out in a solvent which is miscible with water to a great extent but which dissolves the initial materials. Alcohols are preferably used for this purpose which correspond to the alkoxy groupings on the monomeric precursors of the initial materials or to the alkoxy groups attached to the metal atoms of the optionally used cross-linking agents. Linear or branched alcohols with 1 to 5 C atoms such as methanol, ethanol, n- and i-propanol, n- and i-butanol or n-pentanol, alone or in mixture, are especially suitable. Instead of alcohols, other polar solvents which are miscible with water to a great extent can also be used; however, this is less favorable for engineering reasons on account of the heterogeneous solvent mixtures which arise when the alcohol is split off hydrolytically.

The hydrolysis is preferably carried out with an excess of water above the stoichiometrically required amount. The amount of water necessary in practice for hydrolysis depends on the hydrolysis speed of the particular monomers used in such a fashion that as the amount of water increases and at rather high temperatures, a more rapid hydrolysis occurs. However, an upper limit can be given due to separation and formation of a two-phase system. Basically, a hydrolysis in homogeneous solution is preferred.

The polycondensation itself can be carried out at various temperatures. Since the polycondensation proceeds most rapidly at rather high temperatures, it is simplest to allow it to occur at reflux temperature or just thereunder. In principle, the hydrolysis and/or polycondensation can also be carried out at rather high temperatures, that is, under pressure. The reaction mixture can solidify to a solid mass during the polycondensation. It is appropriate for this reason to add a suitable amount of solvent or water for dilution. The solvent will as a rule be the same as that which was already used in the hydrolysis of the silanes, that is, a lower alcohol with 1 to 5 C atoms is preferably used. Naturally, water can also be used for dilution as an alternative to dilution with a solvent. That which is used in the individual instance also depends on which physical properties are intended to be exhibited by the organopolysiloxane to be prepared The duration and temperature of the postreaction, which can take up to 48 hours, can also exert an influence. As a rule, a postreaction at a rather high temperature results in an increase of mechanical stability and a strengthened structure of the product formed.

The separation of the solid formed can take place according to conventional techniques such as filtration, decanting or centrifuging or also by distilling off the liquid phase. The washing of the solid formed is preferably performed with the solvent used during the precipitation or with water.

The step of tempering often proves to be desirable as regards to an increase in the physical stability of the polycondensates.

The dried and/or tempered product can be classified in customary devices into different particle-sizes. The one or the other of the workup measures of washing, drying, tempering and classifying can be eliminated or carried out in another sequence. A classification can also be performed e.g. on a product which is moist, optionally dried in advance or tempered.

The hydrolysis time is a function of the tendency to hydrolyze the initial material according to formula 4 and/or the cross-linking agent according to formula 6. The readiness for hydrolysis and therewith the hydrolytic speed again depend in particular on the type of alkoxy groups in the silicon or titanium, zirconium or aluminum position. The methoxy group hydrolyses the most rapidly and a retardation occurs as the chain length increases or with increasing branching.

Hydrolysis and polycondensation can be accelerated not only by the addition of bases such as ammonia or also by addition of acids such as e.g. HCl. By using a conventional condensation catalyst such as e.g. dibutyl tin diacetate acceleration can also be obtained. In order to compensate a differing hydrolytic and polycondensation behavior of the silane monomers according to formula 4 and of the cross-linking component according to formula 6, the monomers can be precondensed first, according to a preferred preparative variant of the invention. To this end, the silane according to formula 4 and the cross-linking agent or agents according to formula 6 are precondensed together for a period of 5 minutes to 72 hours at room temperature to 200° C., either with or without one of the previously selected solvents, e.g. using an alcohol with 1 to 5 C atoms corresponding to the alkoxy groups. This reaction is carried out in the presence of an amount of water which is not sufficient for complete hydrolysis within the given precondensation time period preferably in the presence of 1 to 100 mole % of the amount required for this.

In order to favor this precondensation effect, a condensation catalyst of the previously mentioned conventional type can be added. Ammonia, hydrochloric acid, acetic acid or phosphoric acid are preferably used. After the precondensation has taken place, the complete hydrolysis and condensation are carried out as described. The precondensation can naturally also be carried out under a pressure corresponding to the sum of the partial pressures of the reaction components.

In the case of special applications or especially desired physical properties of the organopolysiloxane urea derivatives or organopolysiloxane thiourea derivatives cross-linked in accordance with the invention, it can be advantageous according to a further process variant of the invention to precondense the monomer component according to formula 4 and the cross-linking agent or agents according to formula 6 separately from one another. This procedure results in the formation of polymers in which the polymer units according to formula 1 and 3 are present in the form of blocks. This method provides that a silane component of formula 4 and the cross-linking agent or agents according to formula 6 are precondensed separately from each other with or without the use of an alcohol with 1 to 5 C atoms corresponding to the alkoxy groups. The reaction takes place in the presence of an amount of water which is not sufficient for complete hydrolysis within the given precondensation time period, preferably in the presence of 1 to 100 mole % of the amount required for this. A time period of 5 minutes to 72 hours is generally used. The reaction takes place at room temperature to 200° C. and then the complete hydrolysis and polycondensation are carried out as described. Naturally, one of the described conventional precondensation catalysts can again be used in this precondensation or the precondensation can be carried out under pressure.

According to a further process variant of the invention, products are obtained in which the polymer units according to formula 1 and 3 are partially present in the form of blocks, that is, according to this variant, at least one monomer component according to formula 4 or 6 is always precondensed, as previously described, and at least one monomer component according to formula 4 or 6 is not precondensed. Subsequently, precondensed and non-precondensed components are combined with each other and, after the addition of more water as well as, optionally, more solvent, the complete hydrolysis and polycondensation of the entire mixture is carried out as described above. The further treatment of the polycondensate formed thereby then follows the other methods of the invention.

The new organopolysiloxane urea and thiourea derivatives are characterized in particular by means of the quantitative hydrolysis yields, the elementary analyses and by their chemical behavior.

There is no difference, purely optically speaking, between the copolycondensates obtained according to the various preparative methods. Depending on the pretreatment, the polymers of the invention exhibit surfaces of 0.1 to 1000 m$^2$/g and particle-size diameters of approximately 1 cm to 1 μm. A preferred particle-size range can be readily adjusted thereby.

The decomposition points for the new polymeric ureas and thioureas are naturally different. However, they are generally distinctly over 100° C. in air and over 150° C. under an atmosphere of protective gas.

Other significant subject matter of the invention for the polymeric thioureas of the invention consists in their use for removing dissolved metals from a liquid, aqueous or organic phase according to the static or dynamic principle. Naturally, the polymeric thioureas exhibit affinities thereby which are comparable to the different metals like monomeric, soluble thioureas of comparable structure.

DETAILED DESCRIPTION OF THE INVENTION

The invention is described further in the following by means of examples of embodiments.

EXAMPLE 1

121.2 g (0.25 mole) of the thiourea

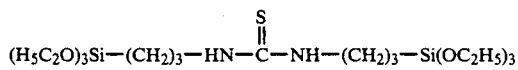

$(H_5C_2O)_3Si-(CH_2)_3-HN-\overset{\overset{S}{\|}}{C}-NH-(CH_2)_3-Si(OC_2H_5)_3$ were dissolved in 150 ml ethanol. The clear solution was transferred into a 1-liter three-neck flask with KPG agitator, reflux condenser and drop funnel and heated to reflux temperature. After the addition of 50 ml desalinated water containing 0.1% by weight $NH_3$, the mixture was agitated under reflux until the start of gelling (approximately 1 hour).

The gel formed was diluted with 200 ml ethanol and then agitated 2 hours further under reflux. The reaction mixture was then cooled, the solid formed filtered off via a vacuum nutsche, washed with 2×100 ml ethanol and dried 16 hours at 100° C. in a drying oven. After 2 hours of grinding the solid in a ball mill and subsequent sieving, 65.1 g (99.2% of theory) product were obtained formed of polymer units of the formula:

$O_{3/2}Si-(CH_2)_3-HN-\overset{\overset{S}{\|}}{C}-NH-(CH_2)_3-SiO_{3/2}.$

The product had a particle size of approximately 50 μm.

| Analyses: | % C | % H | % N | % S | % Si |
|---|---|---|---|---|---|
| Theory: | 32.0 | 5.4 | 10.7 | 12.2 | 21.4 |
| Observed: | 30.8 | 5.2 | 10.3 | 12.7 | 20.7 |

Specific surface: 456 m²/g.

EXAMPLE 2

Starting with 121.2 g (0.25 mole) of the thiourea

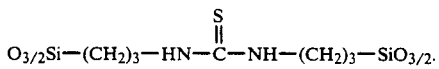

$H_2N-\overset{\overset{S}{\|}}{C}-N[(CH_2)_3Si(OC_2H_5)_3]_2$ 64.8 g (98.8 % of theory) of a polymeric thiourea were obtained in exact analogy with example 1 and formed of polymer units of the formula:

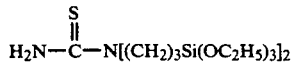

$H_2N-\overset{\overset{S}{\|}}{C}-N[(CH_2)_3SiO_{3/2}]_2.$

The product had a particle size of approximately 50 μm to 150 μm.

| Analyses: | % C | % H | % N | % S | % Si |
|---|---|---|---|---|---|
| Theory: | 32.0 | 5.4 | 10.7 | 12.3 | 21.4 |
| Observed: | 31.2 | 5.0 | 10.0 | 12.0 | 21.0 |

Specific surface: 488 m²/g.

EXAMPLE 3

384.6 g (1.0 mole) of the silicon-substituted urea of the formula:

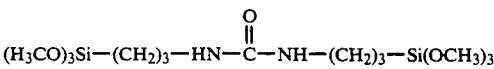

$(H_3CO)_3Si-(CH_2)_3-HN-\overset{\overset{O}{\|}}{C}-NH-(CH_2)_3-Si(OCH_3)_3$ were dissolved in 300 ml methanol. The solution was transferred into a 2-liter three-neck flask with KPG agitator, reflux cooler and drop funnel and heated under slow agitation to reflux temperature. After reflux temperature had been reached, 100 ml desalinated water were added to the solution and the mixture agitated 30 min. more under reflux.

Then, the solution was cooled down to 60° C. and agitated further until the start of gelling. Five min. after the start of gelling, the product mixture was diluted with 200 ml water and the suspension agitated 2 hours more under reflux. The suspension was cooled off, the solid filtered off via a vacuum nutsche, washed with 3×200 ml water, dried 12 hours at 130° C. under an atmosphere of $N_2$ and tempered 24 hours at 160° C., likewise under an atmosphere of $N_2$. 240.2 g (97.5 % of theory) of a polymeric urea were obtained formed of polymer units of the formula:

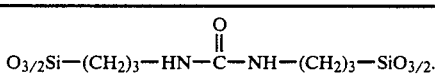

$O_{3/2}Si-(CH_2)_3-HN-\overset{\overset{O}{\|}}{C}-NH-(CH_2)_3-SiO_{3/2}.$

| Analyses: | % C | % H | % N | % Si |
|---|---|---|---|---|
| Theory: | 34.1 | 5.7 | 11.4 | 22.8 |
| Observed: | 33.2 | 5.3 | 10.8 | 21.9 |

Specific surface 225 m²/g.

EXAMPLE 4

42.9 g (0.1 mole) of the thiourea derivative

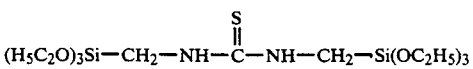

$(H_5C_2O)_3Si-CH_2-NH-\overset{\overset{S}{\|}}{C}-NH-CH_2-Si(OC_2H_5)_3$ and 104.2 g (0.5 mole) $Si(OC_2H_5)_4$ were dissolved in 200 ml ethanol. The solution was transferred into a 1-liter three-neck flask and compounded with 30 ml desalinated water which had been adjusted with diluted hydrochloric acid to pH 3. The solution was heated under agitation to reflux temperature and agitated at this temperature until the start of gelling. The gel formed was diluted with 100 ml ethanol, agitated 2 hours more at reflux temperature and then the solid was filtered off and washed twice with 150 ml ethanol each time. After a 12-hour drying at 120° C. under an atmosphere of $N_2$, 50.3 g (99.3 % of theory) of a polymeric thiourea were obtained formed of polymer units of the formula:

$$O_{3/2}Si-CH_2-NH-\overset{\overset{S}{\|}}{C}-NH-CH_2-SiO_{3/2}.5\ SiO_2.$$

| Analyses: | % C | % H | % N | % S | % Si |
|---|---|---|---|---|---|
| Theory: | 7.1 | 1.2 | 5.5 | 6.3 | 38.8 |
| Observed: | 6.7 | 1.0 | 5.2 | 6.0 | 38.0 |

Specific surface: 526 m²/g.

EXAMPLE 5

137.8 g (0.2 mole) of the thiourea derivative

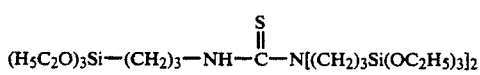
$$(H_5C_2O)_3Si-(CH_2)_3-NH-\overset{\overset{S}{\|}}{C}-N[(CH_2)_3Si(OC_2H_5)_3]_2$$

41.7 g (0.2 mole) Si(OC₂H₅)₄ and 29.7 g (0.2 mole) (H₃C)₂Si(OC₂H₅)₂ were dissolved in 100 ml ethanol. The solution was heated in a 2-liter three-neck flask with KPG agitator, reflux condenser and drop funnel to reflux temperature and compounded with 3 ml 0.1 n HCl solution. After the solution had been agitated 2 hours further under reflux, 50 ml desalinated water were added. Shortly after the addition of the water, the batch gelled at 75° C. After dilution with 300 ml ethanol, the mixture was refluxed 1 hour more, then cooled down, the solid filtered off, washed with 2×100 ml ethanol and dried 15 hours at 85° C. 94.3 g (96.3 % of theory) polymeric product formed of polymer units of the formula:

$$O_{3/2}Si-(CH_2)_3-NH-\overset{\overset{S}{\|}}{C}-N[(CH_2)_3SiO_{3/2}]_2.SiO_2.(H_3C)_2SiO_{2/2}.$$

| Analyses: | % C | % H | % N | % S | % Si |
|---|---|---|---|---|---|
| Theory: | 29.4 | 5.1 | 5.7 | 6.5 | 28.7 |
| Observed: | 29.0 | 4.8 | 5.3 | 6.2 | 28.2 |

Specific surface: 521 m²/g.

EXAMPLE 6

134.6 g (0.2 mole) of the urea derivative $$(H_5C_2O)_3Si-(CH_2)_3-NH-\overset{\overset{O}{\|}}{C}-N[(CH_2)_3Si(OC_2H_5)_3]_2$$

and 21.2 g (0.1 mole) (H₅C₂)Ti(OC₂H₆)₃ were combined in a 1-liter three-neck flask. The mixture was compounded with 2 ml 1 n HCl solution and agitated 3 hours at about 100° C. After the mixture had cooled down to 80° C., 250 ml ethanol and 30 ml water were added and the agitation continued at reflux temperature until the start of gelling. After the addition of 200 ml water, the agitation was continued 1 hour more and then the solid was worked up analogously to example 5. There was obtained 78.8 g (97.0 % of theory) polymeric product formed of polymer units of the formula:

$$O_{3/2}Si-(CH_2)_3-NH-\overset{\overset{S}{\|}}{C}-N[(CH_2)_3SiO_{3/2}]_2.0.5(H_5C_2)TiO_{3/2}.$$

| Analyses: | % C | % H | % N | % Si | % Ti |
|---|---|---|---|---|---|
| Theory: | 32.5 | 5.3 | 6.9 | 20.7 | 5.9 |
| Observed: | 31.7 | 5.0 | 6.5 | 19.9 | 5.7 |

Specific surface: 191 m²/g.

EXAMPLE 7

130.6 g (0.2 mole) of the thiourea derivative

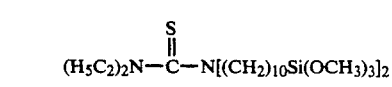
$$(H_5C_2)_2N-\overset{\overset{S}{\|}}{C}-N[(CH_2)_{10}Si(OCH_3)_3]_2$$

were combined with 100 ml n-butanol in a 1-liter three-neck flask with KPG agitator, reflux condenser and drop funnel. The solution was combined with 3 ml in solution of HCl and precondensed 5 hours at 100° C. Subsequently, 24.6 g (0.1 mole) Al(OC₄H₉)₃ and a further 20 ml water were added and the mixture agitated further at approximately 80° C. until the start of gelling. The solid formed was diluted with 100 ml butanol and the entire reaction mixture agitated in an autoclave 5 more hours at 150° C., then filtered off and washed three times with 100 ml methanol per wash. After 15 hours of drying at 150° C. under an atmosphere of N₂, 102.1 g (94.5 % of theory) polymeric product were obtained consisting of units of the formula:

$$(H_5C_2)_2N-\overset{\overset{S}{\|}}{C}-N[(CH_2)_{10}SiO_{3/2}]_2.0.5AlO_{3/2}.$$

| Analyses: | % C | % H | % N | % S | % Si | % Al |
|---|---|---|---|---|---|---|
| Theory: | 55.6 | 9.3 | 5.2 | 5.9 | 10.4 | 5.0 |
| Observed: | 54.7 | 8.8 | 5.0 | 5.7 | 9.7 | 4.7 |

Specific surface: <1 m²/g.

EXAMPLE 8

96.6 g (0.2 mole) of the urea derivative $$(H_5C_2O)_3Si + CH_2 \underset{3}{\to} HN-\overset{\overset{O}{\|}}{C}-NH-CH_2-\overset{\overset{CH_3}{|}}{CH}-CH_2Si(OC_2H_5)_3$$

19.2 g (0.05 mole) Zr(OC₄H₉)₄ were precondensed and polycondensed analogously with example 6. After a workup analogous to that in example 7, 56.6 g (97.1 % of theory) polymeric product were obtained formed of polymeric units of the formula:

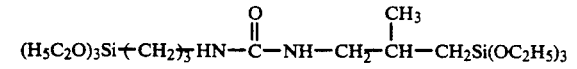
$$O_{3/2}Si(CH_2)_3-HN-\overset{\overset{O}{\|}}{C}-NH-CH_2-\overset{\overset{CH_3}{|}}{CH}-CH_2SiO_{3/2}.0.25ZrO_2.$$

| Analyses: | % C | % H | % N | % Si | % Zr |
|---|---|---|---|---|---|
| Theory: | 33.0 | 5.5 | 9.6 | 19.3 | 7.8 |
| Observed: | 32.1 | 5.2 | 9.1 | 18.6 | 7.4 |

Specific surfaces: 186 m²/g.

EXAMPLE 9

110.6 g (0.2 mole) of the thiourea derivative

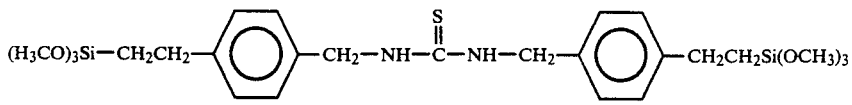

were dissolved in 50 ml methanol and compounded with 3 ml in HCl solution. At the same time, 119.08 (0.6 moles) of

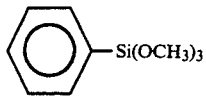

was dissolved in 50 ml methanol and compounded with 3 ml ln HCl solution. Both solutions were agitated separately from one another 2 hours each at reflux temperature and then combined. The combined solutions were compounded with a further 100 ml methanol and 60 ml water and refluxed further until the start of gelling. After a dilution with 200 ml methanol, the mixture was agitated 1 hour further under reflux and then 159.2 g (99.2 % of theory) polymeric product were obtained analogously to example 7 formed of polymer units of the formula:

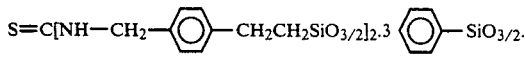

| Analyses: | % C | % H | % N | % S | % Si |
|---|---|---|---|---|---|
| Theory: | 55.4 | 4.6 | 3.5 | 4.0 | 17.5 |
| Observed: | 54.7 | 4.1 | 3.2 | 3.8 | 16.9 |

Specific surface: 85 m$^2$/g.

EXAMPLE 10

5 g of the polymeric thiourea derivative prepared according to example 1 were suspended in 100 ml water in which 40 mg palladium had been dissolved as $Na_2PdCl_4$. The suspension was agitated 1 hour at room temperature and then the solid was filtered off. An analysis of the filtrate yielded a palladium content of only 0.1 mg.

EXAMPLE 11

5 g of the polymeric thiourea prepared according to example 2 were agitated 2 hours at reflux temperature in 100 ml ethanol in which 30 mg rhodium had been dissolved as $RhCl_3$. After the solid was filtered off, an analysis yielded a rhodium content of only 0.5 mg.

EXAMPLE 12

5 g of the polymeric thiourea prepared according to example 4 were suspended 2 hours in 100 ml water in which 10 mg mercury had been dissolved as $HgCl_2$. An analysis of the filtrate yielded a residual mercury content of 0.1 mg.

EXAMPLE 13

10 g of the thiourea prepared according to example 5 with a particle size of 0.2–0.8 mm were transferred into a column with an inner diameter of 15 mm. The column was loaded within 1 hour with 300 ml methanol in which 50 mg silver had been dissolved as $AgNO_3$. An analysis of the solution passed through yielded a residual silver content of 0.2 mg.

The urea derivatives of this, invention are useful precursors of the corresponding carbodiimide which have well established utility in industry.

Further variations and modifications of the foregoing will be apparent to those skilled in the art and are intended to be encompassed by the claims appended hereto.

German priority application P 38 37 415.3-44 is relied on and incorporated herein.

We claim:

1. A solid polymer selected from the group consisting of an organopolysiloxane urea derivative and an organopolysiloxane thiourea derivative, said polymer constructed of recurring units of the formula:

wherein
X stands for O or S and
$R^1$ is:

in which $R^5$ is alkylene with 1 to 10 C atoms or cycloalkylene with 5 to 8 C atoms or a group of the formula:

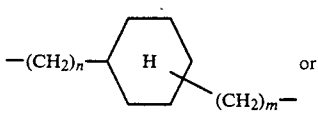

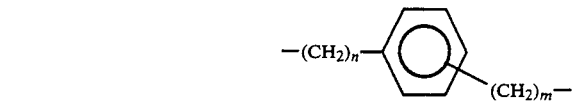

n = 1–6 (on the nitrogen)
m = 0–6 (on the silicon),
wherein $R^2$ has the same meaning as $R^1$ or stands for H, $R^3$ and $R^4$ have the same meaning as $R^1$ or stand for H or linear or branched alkyl with 1 to 5 C atoms and can be identical or different, and wherein always at least two but at the most three groups according to formula 2 are bound to the units according to formula 1 and the free valences of the oxygen atoms bound to the silicon atom are saturated as in silica skeletons defined by (a) silicon atoms of further groups of formula 2 (b) or via the metal atoms in one or more cross-linking bridge members; or by mixtures of (a) and (b), wherein the cross-linking bridge member is represented by the formula:

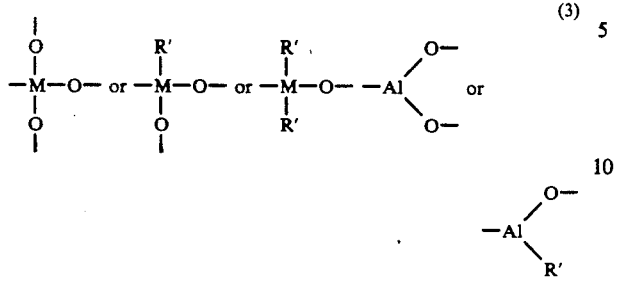

in which M is silicon, titanium or zirconium and R' phenyl or a linear or branched alkyl with 1 to 5 C atoms and the ratio of the silicon atoms from the groups of the formula 2 to the metal atoms in the bridge members according to formula 3 is 1:0 to 1:10.

2. The polymer according to claim 1 wherein formula 2 represents a group of the formula:

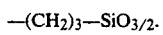

3. A method of preparing a solid polymer selected from the group consisting of organopolysiloxane urea derivative and organopolysiloxane thiourea derivative comprising dissolving a monomeric urea or thiourea of the following formula in a solvent:

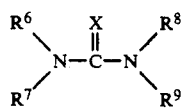

in which $R^6$ stands for a group of the formula:

and $R^5$ is alkylene of 1 to 10 C atoms, cycloalkylene of 5 to 8 C atoms or a group of the formula:

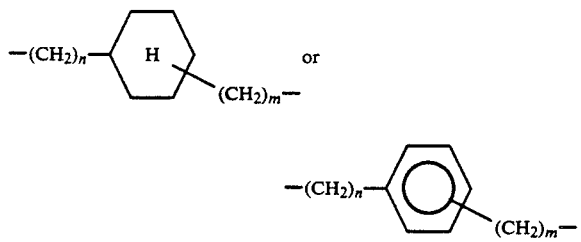

wherein
n=1-6 (on the nitrogen)
m=0-6 (on the silicon)
$R^{10}$ stands for a linear or branched alkyl with 1 to 5 C atoms, $R^7$ has the same meaning as $R^6$ or stands for H, $R^8$ and $R^9$ have the same meaning as $R^6$ or stand for H or a linear or branched alkyl with 1 to 5 C atoms and can be identical or different and wherein at least 2 but at the most 3 groups according to formula 5 are always bound to the units according to formula 4, optionally after the addition of one or more cross-linking agents of the formula:

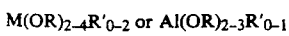

wherein M is silicon, titanium, zirconium
R' is a linear or branched alkyl with 1 to 5 C atoms or phenyl and
R is a linear or branched alkyl with 1 to 5 C atoms and whereby the ratio of the silicon atoms from the groups of general formula 5 to the metal atoms of formula 6 is 1:0 to 1:10,
said solvent being miscible with water to a great but dissolves the urea or thiourea according to formula 4 and the optionally present cross-linking agent according to formula 6,
adding thereto an amount of water under agitation which suffices at least for a complete hydrolysis and condensation, gelling the resulting reaction mixture under further agitation at a temperature in a range from room temperature to 200° C., to form solid polymer, agitating the developing solid further, optionally after the addition of more solvent or water, up to 48 hours at room temperature to 200° C. at normal pressure or at a pressure which corresponds to the sum of the partial pressures at the particular temperature, separating the polycondensate so obtained from the liquid phase, drying at room temperature to 250° C.

4. The method according to claim 3 wherein the solid is first washed then dried.

5. The method according to claim 3 wherein drying is carried out under an atmosphere of protective gas or in a vacuum.

6. The method according to claim 5 wherein the dried product is subsequently tempered 1 to 100 hours at temperatures ranging from 150° to 300° C. in the air, under an atmosphere of protective gas or in a vacuum.

7. The method according to claim 3 further comprising grinding and/or classifying the product.

8. The method according to claim 3, wherein methanol, ethanol, n- and i-propanol, n- and i-butanol or n-pentanol are used alone or in a mixture as the solvent in the hydrolysis.

9. The method according to claim 3, wherein the hydrolysis is carried out with an excess of water.

10. The method of preparing cross-linked organopolysiloxane urea and thiourea derivative compounds comprising precondensing a monomer according to formula (4):

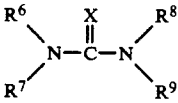

and the cross-linking agent or agents according to formula (6):

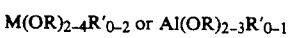

wherein M is silicon, titanium, or zirconium,
R' is a linear or branched alkyl with 1 to 5 C atoms or phenyl and
R is a linear or branched alkyl with 1 to 5 C atoms and whereby the ratio of the silicon atoms from the groups of general formula 5 to the metal atoms of formula 6 is 1:0 to 1:10,
in which $R^6$ stands for a group of the formula:

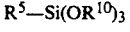

and $R^5$ is alkylene of 1 to 10 C atoms, cycloalkylene of 5 to 8 C atoms or a group of the formula:

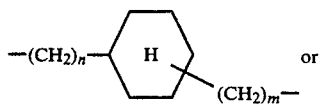

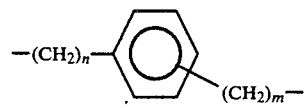

wherein
n = 1–6 (on the nitrogen)
m = 0–6 (on the silicon)
$R^{10}$ stands for a linear or branched alkyl with 1 to 5 C atoms, $R^7$ has the same meaning as $R^6$ or stands for H, $R^8$ and $R^9$ have the same meaning as $R^6$ or stand for H or a linear or branched alkyl with 1 to 5 C atoms and can be identical or different and wherein at least 2 but at the most 3 groups according to formula 5 are always bound to the units according to formula 4, with or without the use of a solvent in the presence of an amount of water which is not sufficient for complete hydrolysis within the given precondensation time period, during a time period of 5 minutes to 72 hours at room temperature to 200° C., to achieve a partial hydrolysis, optionally with the addition of a condensation catalyst, and then, adding more water and, optionally, more solvent, said solvent being miscible with water but dissolves the urea or thiourea according to formula 4 and the present cross-linking agent according to formula 6, agitating the developing solid, optionally after the addition of more solvent or water, up to 48 hours at room temperature to 200° C. at normal pressure or at a pressure which corresponds to the sum of the partial pressures at the particular temperature, separating the polycondensate from the liquid phase, optionally washing, and then drying at room temperature to 250° C., optionally under an atmosphere of protective gas or in a vacuum to obtain the product.

11. The method according to claim 10 wherein the product is 1 to 100 hours at temperatures ranging from 150° to 300° C. in the air, under an atmosphere of protective gas or in a vacuum, optionally ground and/or classified.

12. The method of preparing cross-linked organopolysiloxane urea and/or thiourea compounds comprising precondensing a monomeric component according to formula (4):

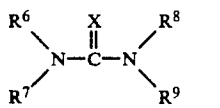
(4)

and the cross-linking agent or agents according to formula (6):

$$M(OR)_{2-4}R'_{0-2} \text{ or } Al(OR)_{2-3}R'_{0-1} \quad (6)$$

wherein M is silicon, titanium, or zirconium,
R' is a linear or branched alkyl with 1 to 5 C atoms or phenyl and R is a linear or branched alkyl with 1 to 5 C atoms and whereby the ratio of the silicon atoms from the groups of general formula 5 to the metal atoms of formula 6 is 1:0 to 1:10, in which $R^6$ stands for a group of the formula:

$$R^5-Si(OR^{10})_3 \quad (5)$$

and $R^5$ is alkylene of 1 to 10 C atoms, cycloalkylene of 5 to 8 C atoms or a group of the formula:

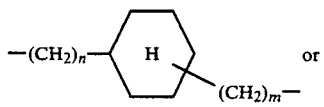

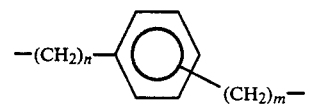

wherein
n = 1–6 (on the nitrogen)
m = 0–6 (on the silicon)
$R^{10}$ stands for a linear or branched alkyl with 1 to 5 C atoms, $R^7$ has the same meaning as $R^6$ or stands for H, $R^8$ and $R^9$ have the same meaning as $R^6$ or stand for H or a linear or branched alkyl with 1 to 5 C atoms and can be identical or different and wherein at least 2 but at the most 3 groups according to formula 5 are always bound to the units according to formula 4, said precondensing being carried out separately from each other for 5 minutes to 72 hours with or without the use of a solvent in the presence of an amount of water which is not sufficient for complete hydrolysis within the given precondensation time period, during a time period of 5 minutes to 24 hours at room temperature to 200° C., optionally with the addition of a condensation catalyst, and thereafter combining each of the precondensed components, adding more water and, optionally, more solvent, agitating the developing solid, optionally after the addition of more solvent or water, up to 48 hours at room temperature to 200° C. at normal pressure or at a pressure which corresponds to the sum of the partial pressures at the particular, temperature, separating the polycondensate from the liquid phase, optionally washing, and then drying at room temperature to 250° C., optionally under an atmosphere of protective gas or in a vacuum to obtain the product.

13. The method according to claim 10 wherein the product is subsequently tempered 1 to 100 hours at temperatures ranging from 150° to 300° C. in the air, under an atmosphere of protective gas or in a vacuum, optionally ground and/or classified.

14. The method of preparing cross-linked organopolysiloxane urea and/or thiourea compounds comprising precondensing monomeric component according to formula (4):

(4)

and the cross-linking agent or agents according to formula (6):

$$M(OR)_{2-4}R'_{0-2} \text{ or } Al(OR)_{2-3}R'_{0-1} \quad (6)$$

wherein M is silicon, titanium, or zirconium,
R' is a linear or branched alkyl with 1 to 5 C atoms or phenyl and
R is a linear or branched alkyl with 1 to 5 C atoms and whereby the ratio of the silicon atoms from the groups of general formula 5 to the metal atoms of formula 6 is 1:0 to 1:10,
in which $R^6$ stands for a group of the formula:

$$R^5-Si(OR^{10})_3 \quad (5)$$

and $R^5$ is alkylene of 1 to 10 C atoms, cycloalkylene of 5 to 8 C atoms or a group of the formula:

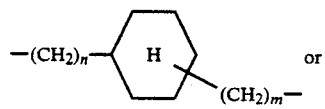

or

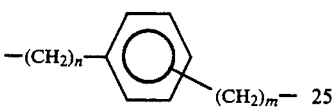

wherein
n = 1-6 (on the nitrogen)
m = 0-6 (on the silicon)
$R^{10}$ stands for a linear or branched alkyl with 1 to 5 C atoms, $R^7$ has the same meaning as $R^6$ or stands for H, $R^8$ and $R^9$ have the same meaning as $R^6$ or stand for H or a linear or branched alkyl with 1 to 5 C atoms and can be identical or different and wherein at least 2 but at the most 3 groups according to formula 5 are always bound to the units according to formula 4 said precondensing being for 5 minutes to 72 hours with or without the use of a solvent in the presence of an amount of water which is not sufficient for complete hydrolysis within the given precondensation time period, during a time period of 5 minutes to 24 hours at room temperature to 200° C., then combining the precondensed and nonprecondensed components and then, adding more water and, optionally, more solvent, agitating the developing solid, optionally after the addition of more solvent or water, up to 48 hours at room temperature to 200° C. at normal pressure or at a pressure which corresponds to the sum of the partial pressures at the particular temperature, separating the polycondensate from the liquid phase, optionally washing, and then drying at room temperature to 250° C., optionally under an atmosphere of protective gas or in a vacuum to obtain the product.

15. The method according to claim 10 wherein the product is subsequently tempered 1 to 100 hours at temperatures ranging from 150° to 300° C. in the air, under an atmosphere of protective gas or in a vacuum, optionally ground and/or classified.

* * * * *